May 26, 1953  E. C. HARTWIG  2,640,152
CONTROL SYSTEM FOR CUTTING APPARATUS
Filed May 31, 1950
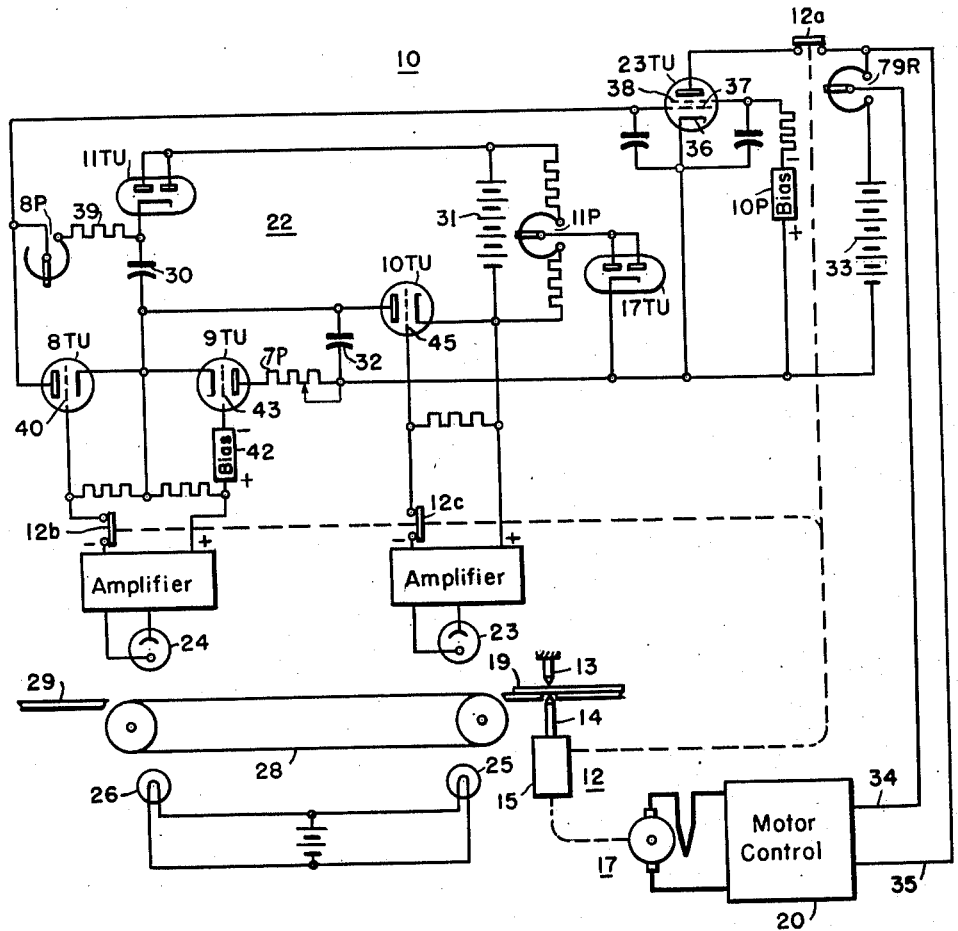
WITNESSES:
E. A. McCloskey
F. V. Giolma
INVENTOR
Edward C. Hartwig.
BY
G. D. Crawford
ATTORNEY Patented May 26, 1953

2,640,152

UNITED STATES PATENT OFFICE 2,640,152

CONTROL SYSTEM FOR CUTTING APPARATUS

Edward C. Hartwig, Lancaster, N. Y., assignor to Westinghouse Electric Corporation, East Pittsburgh, Pa., a corporation of Pennsylvania Application May 31, 1950, Serial No. 165,270

5 Claims. (Cl. 250—27)

My invention relates, generally, to control systems for cutting apparatus, and it has reference in particular to a timer for effecting the operation of cutting apparatus in timed relation with a moving length of material.

Generally stated, it is an object of my invention to provide, in a control system for cutting apparatus, a timer which is simple and inexpensive to manufacture and is also reliable and effective in operation.

More specifically, it is an object of my invention to provide, in a control system for a shear, for operating the shear in timed relation with a moving strip of material, in response to impulses which are responsive to movement of the strip.

Another object of my invention is to provide, in a control system for a shear, for accurately determining the starting time of a shear so as to cut predetermined lengths from a strip of moving material, over a wide range of strip speeds.

Yet another object of my invention is to provide, in a control system for a shear, for measuring the speed of a strip of material that is to be cut as it passes fixed points on the cutoff side of the shear, so as to start the shear motor in predetermined delayed time relation with the speed of the strip for cutting accurate lengths therefrom.

It is also an object of my invention to provide in a control system for a shear for using a timer which enables a simple up-cut type of shear to accurately cut a moving strip of material to length without stopping the strip, more than momentarily at the actual moment of cutting.

It is an important object of my invention to provide, in a control system for a shear, for measuring the speed of a moving strip of material and producing a timed impulse in response thereto for determining the starting time of the shear.

Another important object of my invention is to provide, in a control system for a shear, for using timing circuits of the capacitor discharge type for controlling a valve device to determine the starting time of the shear, and for utilizing the discharge circuit of one of the capacitors for neutralizing its positive bias effect on the valve device during its standby interval.

Other objects will in part be obvious, and will in part be explained hereinafter.

In practicing my invention in accordance with one of its embodiments, a valve device for controlling the operation of a shear motor to actuate a shear for cutting predetermined lengths from a moving strip of material, is controlled by a timer which is responsive to impulses provided by spaced-apart photoelectric devices located on the cutoff side of the shear. These impulses are applied to the timer which utilizes a pair of condenser discharge timing circuits which apply opposed control voltages to the valve device. The discharge circuits are sequentially rendered effective in response of receipt of the impulses so that the valve device is rendered conductive when the voltages become substantially equal, which occurs in predetermined timed relation with movement of the strip.

For a more complete understanding of the nature and scope of my invention, reference may be made to the following detailed description, which may be read in connection with the accompanying drawing, in which the single figure is a diagrammatic view of a shear control system embodying the invention in one of its forms.

Referring generally to the drawing, the reference numeral 10 may denote generally a control system for a shear 12 which may be of the up-cut type, having a stationary blade 13 and a movable blade 14 operated by a suitable mechanism 15 disposed to be driven by a shear motor 17 for cutting predetermined lengths from a moving strip of material 19.

The motor 17 may be provided with suitable control means 20, of a type well known in the art, for operation under the control of a timer 22 which may be disposed to effect operation of the motor control means 20 to start the motor 17 in response to impulses from scanners comprising a pair of photoelectric cells or devices 23 and 24 which may be disposed in connection with their associated light sources 25 and 26 in predetermined spaced relation and movable to different positions on the cutoff side of the shear for effecting operation of the shear to cut sheets of different lengths. Means such as a belt conveyor 28 may be provided for carrying away lengths of the material, such as the length 29, which may have been previously cut.

In order to utilize a simple up-cut type of shear which functions generally like a pair of scissors, consideration must be given to the time delay which is necessary to match the operation of the shear with the speed of the strip, if accurate cuts are to be made. To provide an electrical circuit to furnish the intelligence to control the shear motor, the following considerations may be made where:

$L$ = desired sheet length in feet
$S$ = speed of the strip in feet per second
$T_K$ = delay of the shear motor system measured in seconds from the time the starting impulse is transmitted to the motor until the shear engages the strip
$D_1$ = distance in feet from the shear to the second photocell
$D_2$ = distance in feet between photocells $T_0$ = time from interruption of second photocell until the cut is made $T_1$ = the difference between $T_0$ and $T_K$ $T_2$ = the time for the strip to travel between the two photocells.

From the above, it will be apparent that (1) $$T_1 = \frac{L - D_1}{S} - T_K$$

and $$T_2 = \frac{D_2}{S}$$

The equations of the electrical circuit that measure $T_1$ may be derived as follows:

$$E_2 = E_B e^{-\frac{T_2}{R_2 C_2}}$$

and $$E_1 e^{-\frac{T_1}{R_1 C_1}} = E_2 = E_B e^{-\frac{T_2}{R_2 C_2}}$$

where $E_1$ and $E_2$ are the voltages of capacitor discharge timing circuits comprising capacitors $C_2$ and $C_1$ having in their discharge circuits resistance of values $R_2$ and $R_1$, respectively. If these voltages are applied to the control electrode of a valve device which is rendered conductive when $E_2 = E_1$, the conditions for the equations will be met. Taking the natural logarithm of each side, it will be found that (2) $$T_1 = \frac{R_1 C_1}{R_2 C_2} T_2 - R_1 C_1 \log_e \frac{E_B}{E_1}$$

Since $T_1$ is the same quantity as in Equation 1, then Equation 1 is equal to Equation 2 and $$\frac{L - D_1}{S} - T_K = \frac{R_1 C_1}{R_2 C_2} \cdot \frac{D_2}{S} - R_1 C_1 \log_e \frac{E_B}{E_1}$$

In order that the equation is satisfied for all values of S, (3) $$T_K = R_1 C_1 \log_e \frac{E_B}{E_1}$$

Inspection of Equation 2 shows that $T_K$ must always be a positive quantity, and from Equation 3 it may be seen that $E_B$ must be greater than $E_1$.

Referring again to the drawing, it will be seen that the timer 22 comprises a timing capacitor 30 which corresponds to the capacitor $C_2$ of the equations set forth hereinbefore. A blocking rectifier device 11TU is provided for charging the capacitor 30 from a suitable source of voltage represented by a battery 31, through a control valve 10TU, which is connected in the charging circuit of the capacitor 30 for determining the charging period.

An additional timing capacitor 32 corresponding to the capacitor $C_1$ of the equations set forth hereinbefore is also provided. The capacitor 32 is connected in circuit relation with the source 31 by means of a voltage divider including a speed compensating potentiometer device 11P which makes Equation 3 true by determining the ratio between the voltage of the capacitor 32 and that of the capacitor 30 and providing an adjustment for matching the electrical system to the shear drive system. For example, if the length of the sheet cut increases with increased speed, the potentiometer 11P should be moved counterclockwise. The capacitor 32 is connected to the battery 31 in circuit relation with the valve device 10TU and a blocking rectifier device 17TU.

Operation of the motor control apparatus 20 is determined by means of a valve device 23TU which may be connected in circuit relation with a source of plate voltage such as a battery 33 and a potentiometer device 19R for applying a control impulse to the control apparatus 20 through conductors 34 and 35. The valve device 23TU is provided with a negative blocking bias voltage on control grid 38 from a source of bias voltage 10P. The conductivity of the valve device 23TU is determined by connecting the capacitors 30 and 32 in circuit relation with the cathode 36 and the control electrode 37 of the valve device. The capacitor 30 is provided with a discharge circuit including as the equivalent of the resistance $R_2$ of the equation a resistor 39, and adjustable resistance device 8P, which provides an adjustment for matching the length of sheet cut with that indicated for the position of the photoelectric devices, and a discharge valve device 8TU. The valve device 8TU is provided with substantially zero bias so as to be normally conductive. The control electrode 40 of the valve device 8TU is connected so as to be subjected to a negative blocking bias voltage from the photoelectric device 23 when the leading edge of the strip passes between the device 23 and its light source 25.

The capacitor 32 is provided with a discharge circuit including a discharge valve device 9TU and a variable resistance device 7P which represents the resistance $R_1$ of the equation and provides a vernier adjustment for 11P by varying the discharge time of capacitor 32 and hence one of the voltages applied to potentiometer 11P as can be seen by examining the Equation 3 in column 3. The valve device 9TU is provided with a source of negative grid bias voltage 42, and the control electrode 43 of the valve device is connected so as to be subjected to a positive control impulse from the photoelectric device 24. The valve device 10TU is provided with substantially zero grid bias so as to be normally conductive to effect charging of the capacitors. Its control electrode 45 is connected so as to be subjected to a negative impulse voltage from the photoelectric device 23 in order to determine the charging interval and commence the timing sequence.

In operation, the valve device 10TU will be normally conductive to effect charging of the capacitors 30 and 32. The discharge valve device 8TU being normally conductive, the voltage drop across the resistor 39 and the potentiometer 8P will be negative with respect to the control electrode 37 of the valve device 23TU. This substantially neutralizes the positive bias effect of the capacitor 30, so that the capacitor 32 is effective to make the control electrode negative with respect to the cathode 36, and hence hold the valve device in a non-conductive condition.

As soon as the leading edge of the strip 19 intercepts the light on the photoelectric device 23, the control valve 10TU is rendered non-conductive and the charging of the capacitors ceases. The timing interval determined by the discharge of capacitor 30 therefore commences immediately, since the valve device 8TU is normally conductive.

As soon as the leading edge of the strip intercepts the light on the second photoelectric device 24, the discharge valve 8TU is rendered non-conductive, thus fixing the voltage across the capacitor 30. At the same time, the discharge valve device 9TU is rendered conductive, and the capacitor 32 commences to discharge. When the voltage $E_1$ of the capacitor 32 substantially equals the voltage $E_2$ of the capacitor 30, the valve device 23TU will be rendered conductive. A voltage from the potentiometer device 79R will be impressed between the conductors 34 and 35 for effecting operation of the motor control apparatus to start the shear motor 20. Limit switch 12a, contact members 12b and 12c operatively connected to the shear 12 open and interrupt the plate circuit of the valve device 23TU, and the connections of the photoelectric scanners to the timer and shortly before the shear motor stops, they reclose and reset the timer for a successive operation.

From the above description and the accompanying drawing, it will be apparent that I have provided a timer for a shear control system which is simple and effective in operation and which provides for accurately controlling the shear to cut predetermined lengths from a moving strip of material. By utilizing a control circuit in which the time delay is proportional to the ratios of capacitor voltages, which ratio is directly dependent on the speed of the strip, accurate control of the shear is effected over a wide range of strip speeds. By utilizing a control system embodying the invention, it is possible to make accurate cuts of a moving strip of material with a relatively simple up-cut type of shear.

Since certain changes may be made in the above-described construction, and different embodiments of the invention may be made without departing from the spirit and scope thereof, it is intended that all the matter contained in the above description and shown in the accompanying drawing shall be considered illustrative and not in a limiting sense.

I claim as my invention:

1. In a control system, a first timing circuit including a capacitor, a resistor and discharge means therefor, a second timing circuit including a capacitor, a resistor and discharge means therefor, valve means normally disposed to provide charging circuits for the capacitors, impulse means operable to render said valve means non-conductive, additional impulse means operable to render the discharge means of the first timing circuit non-conductive and the discharge means of the second timing circuit conductive, valve means having a control electrode, and circuit means connecting the timing circuits to the control electrode to provide a blocking bias to render said valve means non-conductive until the voltages of the capacitors in the timing circuits reach a predetermined relation.

2. In a timing circuit for a valve device having a control electrode and a cathode, a capacitor timing circuit connected to apply a negative blocking bias between the electrode and cathode, an additional capacitor timing circuit connected in circuit relation with said timing circuit to apply an opposing bias voltage between the electrode and cathode, circuit means including a discharge circuit for the additional timing circuit disposed to provide a neutralizing bias for said opposing bias, impulse means disposed to provide a first impulse to render the additional timing circuit effective, additional impulse means disposed to produce a second impulse in timed relation with said first impulse to render the discharge circuit of the additional timing circuit ineffective and provide a discharge circuit for rendering the first-mentioned capacitor timing circuit effective.

3. In a control system, a valve device, a pair of capacitor timing circuits connected to apply variable positive and negative control voltages to the valve device, said positive control voltage being greater than the negative control voltage, its timing circuit including a portion of a discharge circuit normally effective to provide a neutralizing control voltage to render the positive control voltage ineffective, a charging circuit for the capacitors of the timing circuits, circuit means responsive to a first impulse to interrupt the charging circuit and render the positive control voltage timing circuit effective to reduce its voltage to a value below the negative control voltage, and additional circuit means responsive to a second impulse to render the negative control voltage timing circuit effective to reduce the negative control voltage and interrupt the discharge circuit of the positive control voltage timing circuit, said valve device being connected to conduct when the voltage of the negative control voltage timing circuit reaches substantially the same valve as the voltage of the positive control voltage timing circuit.

4. In a timer disposed to produce a predetermined time delay in response to a pair of spaced timing impulses, a valve device having a control electrode, a first timing circuit including a capacitor having a discharge circuit rendered effective by the second of said impulses, said capacitor being connected to apply a blocking bias voltage to said control electrode, a second timing circuit including a capacitor and a discharge circuit rendered ineffective by said second impulse, said capacitor being connected to apply an unblocking bias voltage to the control electrode and said discharge circuit being connected to apply a neutralizing blocking voltage to the control electrode during discharge of said capacitor, and charging means for said capacitor disposed to be rendered inoperative in response to the first of said impulses.

5. In a timer, a pair of capacitors, charging means for said capacitors including a charging valve device disposed to be rendered non-conductive in response to an impulse signal, a discharge circuit for one of the capacitors including resistance means for producing a voltage drop substantially equal to the capacitor voltage and a control valve having a control electrode disposed to render said valve non-conductive on receipt of a second signal impulse, a discharge circuit for the other of the capacitors including a valve device disposed to be rendered conductive upon receipt of said second impulse signal and resistance means, and circuit means connecting said capacitor in opposed relation in the control circuit of a valve device, including the resistance means for said one of the capacitors, said one of the capacitors being disposed to apply a positive control voltage to the control circuit.

EDWARD C. HARTWIG.

References Cited in the file of this patent

UNITED STATES PATENTS

| Number | Name | Date |
|---|---|---|
| 2,401,396 | Wolfner | June 4, 1946 |
| 2,428,592 | Stadum | Oct. 7, 1947 |
| 2,429,500 | Wolfner | Oct. 21, 1947 |
| 2,451,816 | Dunn | Oct. 19, 1948 |
| 2,529,161 | Kelling et al. | Nov. 7, 1950 |
| 2,538,515 | Hanchett | Jan. 16, 1951 |
| 2,542,631 | Crain | Feb. 20, 1951 |
| 2,563,828 | Fahrner | Aug. 14, 1951 |